(12) United States Patent
Correa Bahnsen et al.

(10) Patent No.: US 10,944,789 B2
(45) Date of Patent: Mar. 9, 2021

(54) PHISHING DETECTION ENHANCED THROUGH MACHINE LEARNING TECHNIQUES

(71) Applicant: Easy Solutions Enterprises Corp., Doral, FL (US)

(72) Inventors: Alejandro Correa Bahnsen, Bogota (CO); Ivan Dario Torroledo Pena, Bogota (CO); Luis David Camacho Gonzalez, Bogota (CO); Sergio Villegas Piedrahita, Bogota (CO)

(73) Assignee: Easy Solutions Enterprises Corp., Doral, FL (US)

( * ) Notice: Subject to any disclaimer, the term of this patent is extended or adjusted under 35 U.S.C. 154(b) by 192 days.

(21) Appl. No.: 16/045,527

(22) Filed: Jul. 25, 2018

(65) Prior Publication Data

US 2020/0036750 A1    Jan. 30, 2020

(51) Int. Cl.
*H04L 29/06*      (2006.01)
*G06K 9/62*       (2006.01)
*G06N 20/00*      (2019.01)

(52) U.S. Cl.
CPC ........ *H04L 63/1483* (2013.01); *G06K 9/6256* (2013.01); *G06K 9/6262* (2013.01);
(Continued)

(58) Field of Classification Search
CPC ............. H04L 63/1483; H04L 63/1416; H04L 63/1425; G06N 20/00; G06K 9/6256; G06K 9/6262; G06K 9/6267
See application file for complete search history.

(56) References Cited

U.S. PATENT DOCUMENTS 10,581,888 B1 *   3/2020  Agranonik ............. H04L 63/20
2003/0061515 A1 * 3/2003  Kindberg ........... H04L 63/0281
                                                        726/4
(Continued)

FOREIGN PATENT DOCUMENTS

KR        101720538 B1    3/2017

OTHER PUBLICATIONS

Alejandro Correa Bahnsen et al., "Classifying Phishing URLs Using Recurrent Neural Networks", 2017 APWG Symposium on Electronic Crime Research, Apr. 27, 2017. (Year: 2017).*
(Continued)

*Primary Examiner* — Izunna Okeke
*Assistant Examiner* — Stephanie S Ham
(74) *Attorney, Agent, or Firm* — Greenberg Traurig

(57) ABSTRACT

Phishing enhancement and phishing detection enhancement technologies. The technologies can include determinations of an effectiveness rate of one or more phishing threat actors. The technologies can also include selection of effective URLs from at least one effective phishing threat actor. The technologies can also include generation or adjustment of a phishing system using a machine learning process to identify patterns in the selected effective URLs that enable the selected effective URLs to avoid detection by the phishing detection system. The technologies can also include generation of synthetic phishing URLs using the phishing system and the identified patterns. The technologies can also include adjustments or training of the phishing system or the phishing detection system according to the synthetic phishing URLs to enhance the systems.

19 Claims, 9 Drawing Sheets

(52) U.S. Cl.
CPC ........... *G06K 9/6267* (2013.01); *G06N 20/00* (2019.01); *H04L 63/1416* (2013.01); *H04L 63/1425* (2013.01)

(56) References Cited

U.S. PATENT DOCUMENTS

| | | | |
|---|---|---|---|
| 2015/0067839 A1* | 3/2015 | Wardman | H04L 63/1483 726/22 |
| 2015/0264086 A1 | 9/2015 | Feng et al. | |
| 2017/0187747 A1* | 6/2017 | Huston, III | H04L 63/1458 |
| 2019/0171822 A1* | 6/2019 | Sjouwerman | H04L 63/1433 |
| 2019/0188463 A1* | 6/2019 | Sodhani | G06K 9/6262 |
| 2019/0215329 A1* | 7/2019 | Levy | H04L 63/145 |
| 2019/0347553 A1* | 11/2019 | Lo | G06N 3/063 |
| 2020/0027157 A1* | 1/2020 | Xu | G06N 20/00 |
| 2020/0067861 A1* | 2/2020 | Leddy | H04L 51/12 |

OTHER PUBLICATIONS

Alejandro Correa Bahnsen et al., "Classifying Phishing URLs Using Recurrent Neural Networks", 2017 APWG Symposium on Electronic Crime Research, Apr. 27, 2017.

Hung Le et al., "URLNet: Learning a URL Representation with Deep Learning for Malicious URL Detection", arXiv:1802.03162v2 [cs.CR], Mar. 2, 2018.

International Search Report and Written Opinion, PCT/US2019/042945, dated Oct. 31, 2019.

Samuel Marchal et al., "PhishScore: Hacking phishers' minds", 10th International Conference on Network and Service Management and Workshop, Nov. 21, 2014.

\* cited by examiner

Input: effectiveURLs
Output: syntheticURLs
    *Initialization* :
1: vocabulary = generateVocabulary(effectiveURLs)
   sentences = generateSentences(effectiveURLs)
   *Enconding* :
2: oneHot = oneHotEncoding(vocabulary,sentences)
   *Training* :
   model = modelImplementation(oneHot)
3: text = seed()
4: for sentence $\in$ sentences do
5:    text $\leftarrow$ model.predictCharacter(sentence)
6: end for
7: paths = getPaths(text)
8: syntheticURLs = completeURLs(domains,paths)
9: return syntheticURLs

FIG. 7

PHISHING DETECTION ENHANCED THROUGH MACHINE LEARNING TECHNIQUES

TECHNICAL FIELD

Embodiments of the disclosure relate generally to malicious artificial intelligence and detection of such artificial intelligence, and more specifically, relate to phishing enhancement and detection using artificial intelligence.

BACKGROUND

Phishing is a deceptive electronic communication used to obtain sensitive information such as usernames, passwords, and other credentials. Phishing can also be used to obtain account information such as credit card details. Phishing is often malicious and is disguised as a trustworthy electronic communication.

Often phishing is carried out through email or electronic messaging and it is common for phishing to direct a user to enter credentials or other forms of sensitive information at a counterfeit website. Typically, a counterfeit website will have a look and feel like a corresponding legitimate website, but the URL of each website will be different. Websites often targeted by phishing attacks include social media sites, e-commerce sites, and online banking sites.

SUMMARY

Disclosed herein are phishing enhancement and phishing detection enhancement technologies. The technologies can include determinations of an effectiveness rate of one or more phishing threat actors. The technologies can also include selection of effective URLs from at least one effective phishing threat actor. The technologies can also include generation or adjustment of a phishing system using a machine learning process to identify patterns in the selected effective URLs that enable the selected effective URLs to avoid detection by the phishing detection system. The technologies can also include generation of synthetic phishing URLs using the phishing system and the identified patterns. The technologies can also include adjustments or training of the phishing system or the phishing detection system according to the synthetic phishing URLs to enhance the systems.

BRIEF DESCRIPTION OF THE DRAWINGS

The present disclosure will be understood more fully from the detailed description given below and from the accompanying drawings of various embodiments of the disclosure.

FIG. 7 illustrates example pseudocode that can be used as a basis for computer programming the phishing URL generator in accordance with some embodiments of the present disclosure.

DETAILED DESCRIPTION

Figure 1A:
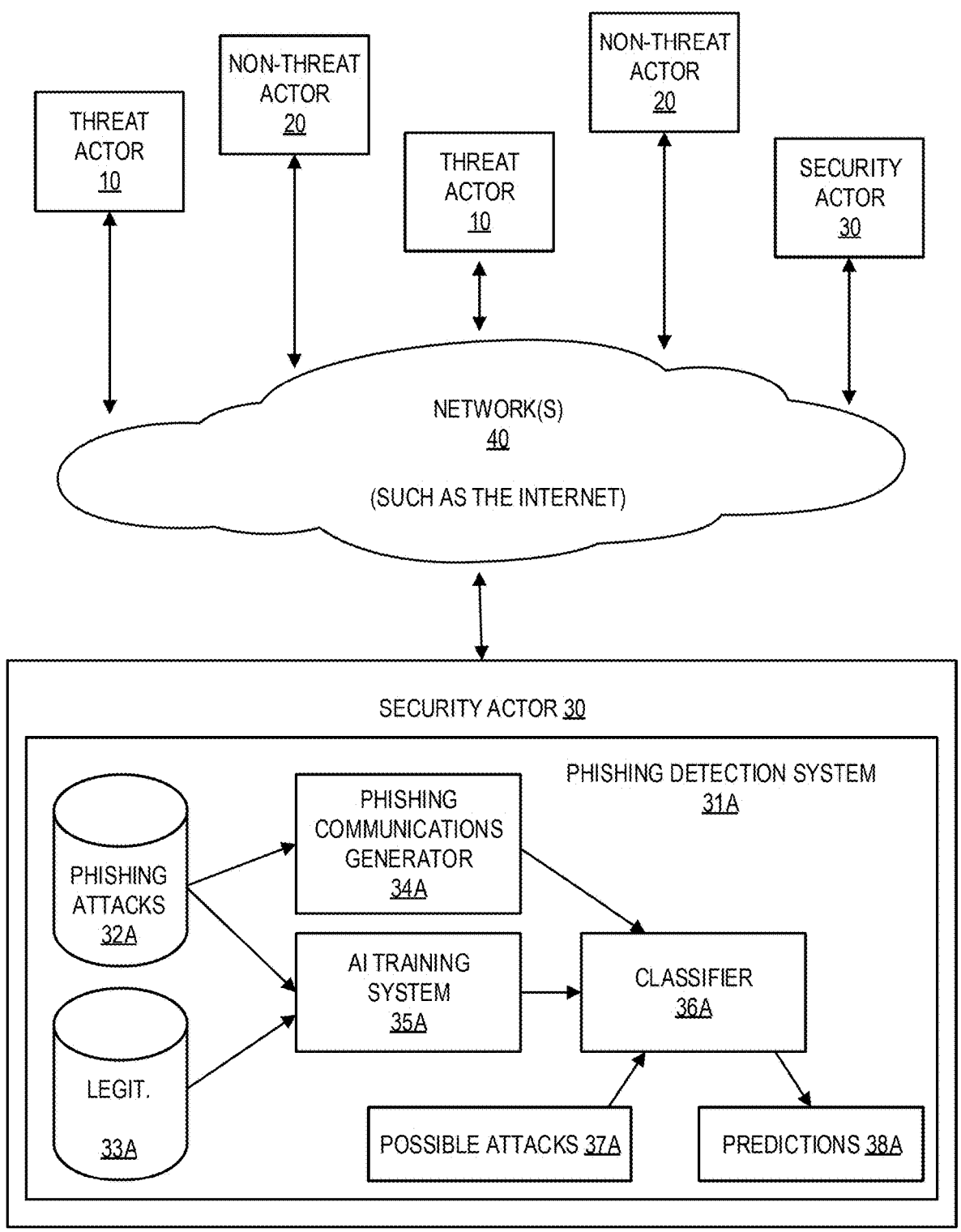
FIGS. 1A and 1B illustrate an example network of computer systems to implement phishing enhancement and detection using artificial intelligence in accordance with some embodiments of the present disclosure.

Aspects of the present disclosure are directed to techniques of artificial intelligence (AI) in phishing attacks and the detection of such techniques. Threat actors can use AI systems to bypass phishing detection systems. However, using historical data, such as previously used phishing Uniform Resource Locators (phishing URLs), a phishing detection system can identify strategies that threat actors use to create phishing URLs.

Also, by simulating a threat actor, different AI technologies (such as deep neural networks) can be used to enhance phishing by the threat actor or a simulation of the threat actor by a security actor. An example of the phishing system described herein uses a long short-term memory (LSTM) network to enhance simulated phishing by a security actor.

AI (such as machine learning) can provide cybersecurity and defense against phishing. The phishing detection system described herein has improved phishing detection compared to traditional detection technologies that may include manual classification. Also, described herein is the phishing system, which can be a simulator or an actual phishing system. Using the phishing system, a threat actor or a security actor can weaponize AI or machine learning to enhance phishing attacks.

Phishing communications used in an attack (such as phishing URLs) are traditionally generated by manual processes. Some automation technologies are also known for generating phishing communications such as randomly generated phishing URLs. And, some known defensive technologies for phishing detection use machine learning technologies or automation in general.

However, threat actors are constantly seeking new ways to bypass phishing detections systems. And, as threat actors improve their attacks, traditional detection systems have difficulty identifying improved phishing communications.

Conventionally, phishing detection can be done via known proactive or reactive systems. Reactive systems include services that provide blacklists of malicious URLs that can be queried. The blacklists are constructed using different technologies, including manual reporting, honeypots, or by crawling the web in search of known phishing characteristics. Browsers make use of blacklists to block access to listed phishing URLs. A drawback of such a reactive method is that for a phishing URL to be blocked, it must be previously included in the blacklist. This implies that web users remain at risk until the URL is submitted and the blacklist is updated. Also, since many phishing sites are active for less than a day, their attacks are completed before they are discovered and added to a blacklist.

Proactive methods can mitigate the problems with reactive systems, such as by analyzing the characteristics of a webpage or URL in real time to assess the potential risk of a webpage or URL. Risk assessment can be done through a classification system. Some machine learning systems that have been used to detect phishing, include: support vector machines, streaming analytics, gradient boosting, random forests, latent Dirichlet allocation, online incremental learning, and neural networks.

However, many of these technologies use website characteristics for classification, which can mean that to evaluate a site, the site first is to be rendered before the detection system can be used. This can add a significant amount of time to the evaluation process, which is a significant problem for the aforesaid reasons.

An example of the phishing detection system described herein improves on the conventional systems by analyzing URLs only, instead of using webpage content analysis. The example of the phishing detection system that only analyzes URLs reduces the evaluation time because only a limited portion of text is analyzed.

There are known methods of using classification systems to detect phishing URLs; however, such known methods are mainly focused on creating features through expert knowledge and lexical analysis of a URL. Then, the phishing site's characteristics are used as quantitative input, for these conventional models using URL analysis. These conventional models in turn learn to recognize patterns and associations that the input sequences must follow to label a site as a possible legitimate or malicious site.

The novel systems described herein are more flexible, but they can use such known phishing detection systems in combination with novel technologies for phishing URL generation and attack simulation. However, it is more beneficial to use an example phishing detection system disclosed herein that takes advantage of phishing URL classification using deep recurrent neural networks such as LSTM networks.

In addition to the phishing detection system taking advantage of improved phishing detection technologies, AI can be used by the systems described herein as a weapon to enhance phishing by a threat actor or by a simulated threat actor. Known approaches that use AI for simulated phishing attacks include: Honey-Phish, SNAP R, and Deep DGA. And, such known approaches can be combined with the systems disclosed herein. It should be noted that such technologies could also be used for actual phishing attacks and not merely simulations.

Aspects of the present disclosure address the above and other deficiencies by known or convention phishing detection systems and phishing systems. Aspects of the present disclosure address the above-mentioned and other deficiencies by generating a phishing system using a machine learning process to identify patterns in URLs that are effective at phishing by avoiding detection by a phishing detection system. Such aspects include parts for generating synthetic phishing URLs using the phishing system and the identified patterns. Also, such aspects include parts for training, configuring and/or adjusting the phishing detection system or another detection system to better recognize the enhanced phishing URLs.

The phishing system includes a phishing URL generator. The phishing system can be modeled based on one or more objectives of threat actors. And, the phishing URL generator can operate based on the one or more objectives of threat actors.

Figure 1B:
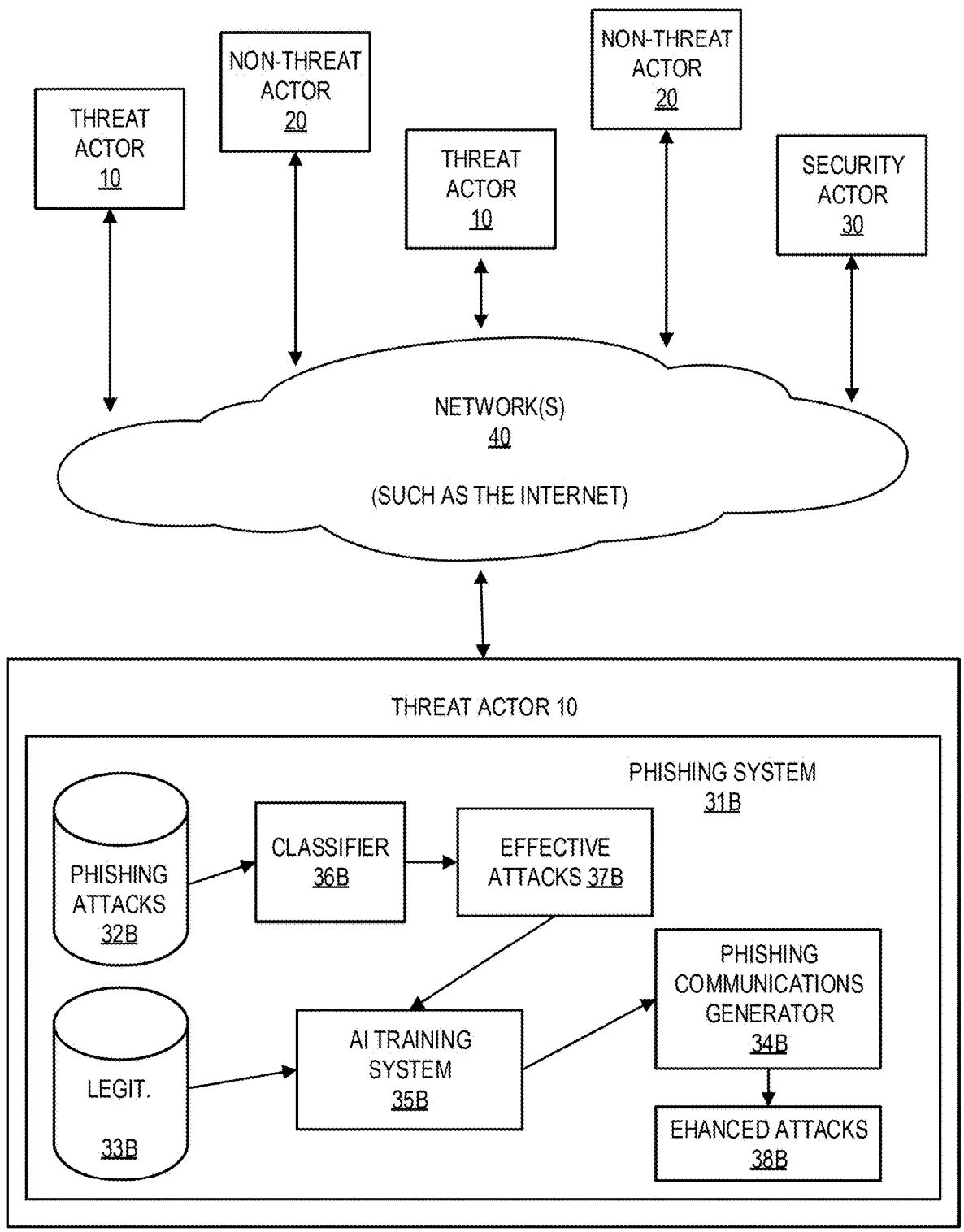

FIGS. 1A and 1B illustrate an example network of computer systems to implement phishing enhancement and detection using artificial intelligence in accordance with some embodiments of the present disclosure. The network of computer systems includes threat actor computer systems 10, non-threat actor computer systems 20, and security actor computer systems 30. The threat actor computer systems 10, the non-threat actor computer systems 20, and the security actor computer systems 30 communicate with each other through one or more communications networks 40.

The communications network(s) 40 can include the Internet and/or any other type of interconnected communications network. The communications network(s) 40 can also include a single computer network or a telecommunications network. The communications network(s) 40 can also include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

Figure 5:
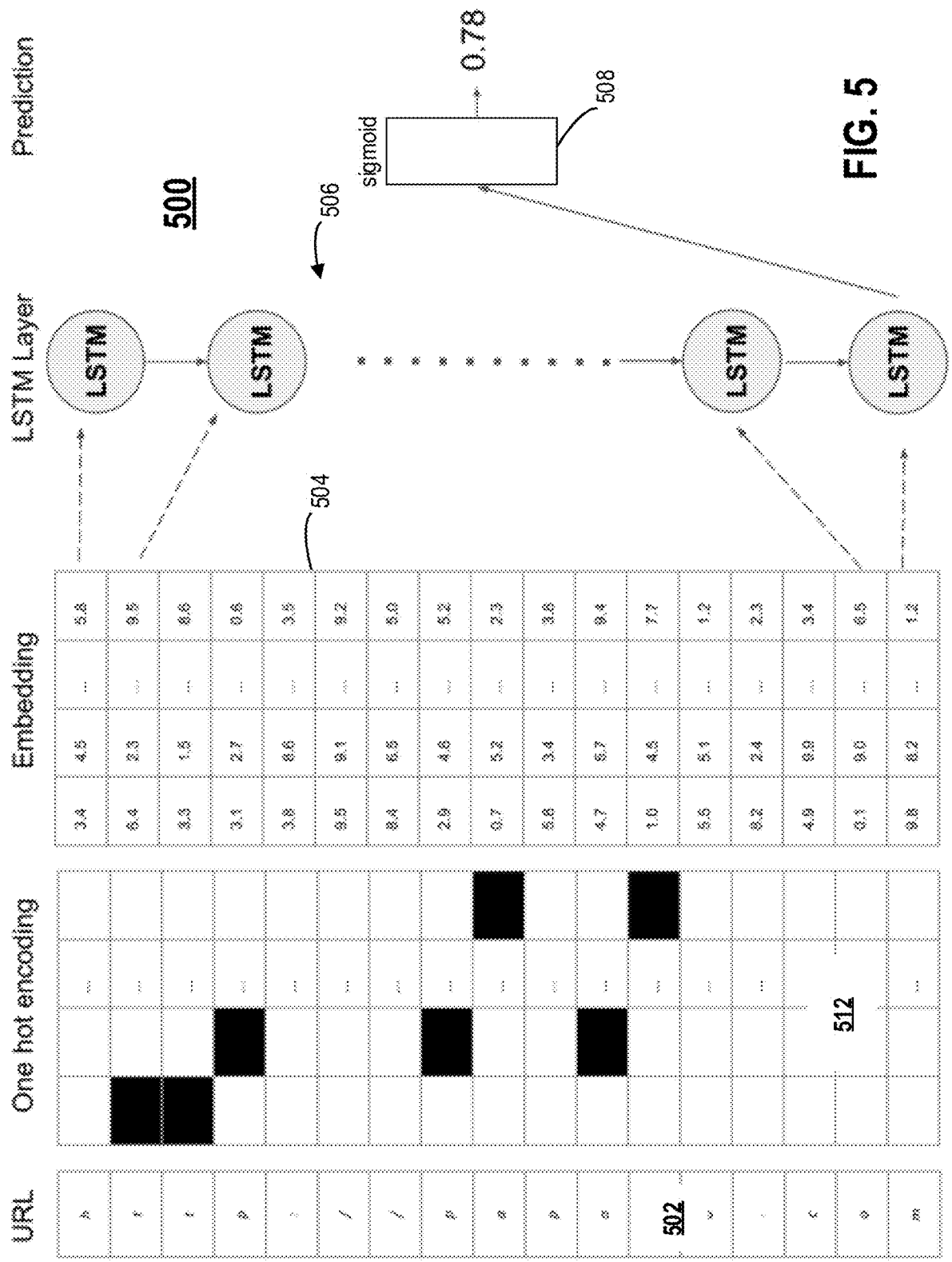
FIG. 5 is schematic diagram of an example artificial intelligence architecture based on a long short-term memory (LSTM) network in accordance with some embodiments of the present disclosure.

The security actor computer systems 30 can include a phishing detection system 31A. The phishing detection system 31A includes a known phishing attacks database 32A, a known legitimate online communications database 33A, and a phishing communications generator 34A (which can include the phishing URL generator). The phishing detection system 31A can also include an AI training system 35A. The phishing detection system 31A can also include a trained classifier 36A (which can include a sigmoid neuron such as shown in FIG. 5). Also, the phishing detection system 31A can include possible phishing attacks 37A and predictions 38A regarding the possible attacks determined by the trained classifier 36A. The classifier 36A determines whether the possible attack is classified as a phishing attack or a legitimate attack (such as whether a URL is a phishing URL or a legitimate URL). If the possible attack is classified (i.e., predicted) as phishing, it is a detected attack. However, this assumes that the prediction is not a false positive. The combination of the AI training system 35A and the trained classifier 36A can include an artificial intelligence architecture based on a LSTM network such as shown in FIG. 5.

Figure 6:
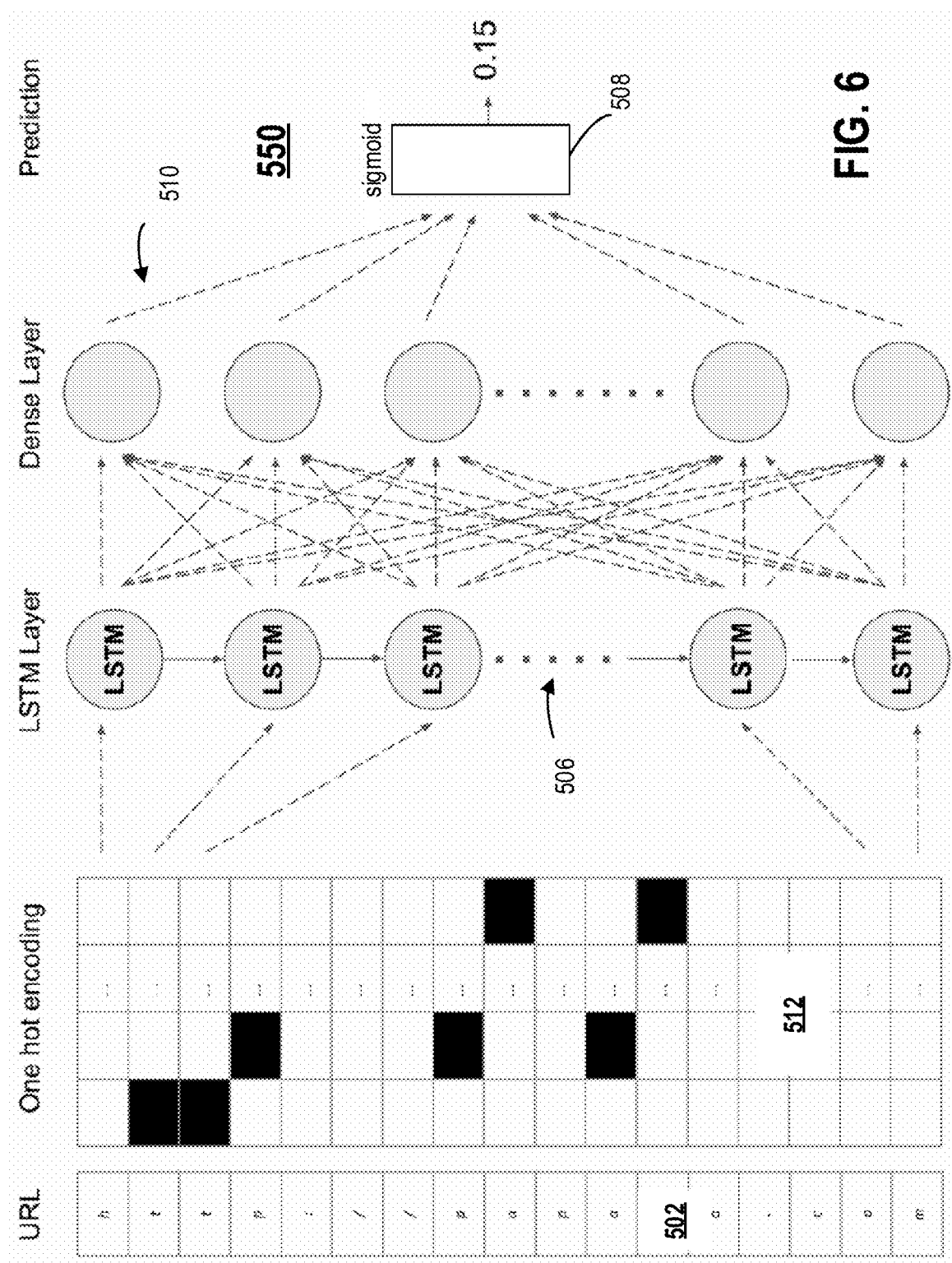
FIG. 6 is schematic diagram of another example artificial intelligence architecture based on a LSTM network in accordance with some embodiments of the present disclosure.

The threat actor computer systems 10 can include a phishing system 31B. The phishing system 31B includes a phishing attacks database 32B. The database 32B is not a known phishing attacks database in that victims or detection systems may not know of the communications stored in database 32B. The phishing system 31B also includes a known legitimate online communications database 33B and a phishing communications generator 34B (which can include the phishing URL generator). The phishing system 31B can also include an AI training system 35B. The phishing system 31B can also include a trained classifier 36B (which can include a sigmoid neuron such as shown in FIG. 6). Also, the phishing system 31B can include effective phishing attacks 37B and enhanced phishing attacks 38B regarding the possible attacks determined by the trained classifier 36B. The combination of the AI training system 35B and the trained classifier 36B can include an artificial intelligence architecture based on a LSTM network such as shown in FIG. 6.

In FIG. 1B, the phishing attacks database 32B can provide a communication such as one or more URLs as input to be fed to a filter (e.g., the trained classifier 36B) to identify and/or generate effective phishing attacks 37B. The effective phishing attacks 37B can then act as input to be fed into a training system (such as the AI training system 35B) to generate a phishing generator (e.g., the phishing communications generator 34B). Then, in some embodiments, the generator can make phishing construction predictions (i.e., predictions of a next object that can be added to a phishing attack to make it effective such as a next character to add to a phishing URL). The predictions added to the attack creates an enhanced attack (e.g., enhanced phishing attacks 38B).

It is to be understood that the security actor can also act like a threat actor via a simulation instead of a real attack. To put it another way, in some embodiments, the security actor can use or generate a generator like the phishing communications generator 34B of the threat actor to train its classifier 36A. Also, in some embodiments, the threat actor can act like a security actor via a simulation in the sense that the threat actor uses a classifier like the classifier 36A of the security actor as a filter to train its generator 34B.

As for database 32A, the stored phishing communications are known by the security actor such that the detection system of the security actor can be trained according to the known phishing threats.

Also, it is to be understood that the phishing detection system 31A includes a separate phishing simulator and phishing detection system.

The threat actor computer systems 10 can use AI systems to bypass phishing detection systems. For example, the threat actor computer systems 10 can include the phishing system 31B as shown in FIG. 1B, and the phishing system 31B can use AI systems to bypass phishing detection systems. The phishing system 31B can bypass phishing detection systems using historical data on phishing attacks from the phishing attacks database 32B, data on legitimate websites from the known legitimate online communications database 33B, the phishing communications generator 34B, the AI training system 35B, and the trained classifier 36B.

The known legitimate online communications database 33A or 33B can include legitimate website data such as legitimate URLs. In examples, the database 33A or 33B has legitimate URLs for corresponding legitimate sites. Also, in examples, the database 32A or 32B has URLs of phishing websites. The phishing communications generator 34A or 34B can generate phishing URLs through learning from effective phishing URLs. Thus, AI-powered phishing URLs are generated using the phishing system 31B in the threat actor computer system 10 and AI-powered phishing URLs can be generated by the phishing detection system 31A for a simulated attack by the security actor computer system 30. To put it another way, if the AI-powered phishing URLs are used in an actual attack, they are from database 32B. If the AI-powered phishing URLs have been used by a threat actor and discovered by a detection system, such URLs can be used to train a phishing attack simulator and/or a detection system of the phishing detection system 31A of the security actor computer system 30.

Also, the phishing system 31B of the threat actor computer system 10 can apply a filter on database 32B such as classifier 36B. For example, URLs of the phishing sites can be selected effective phishing URLs such as shown by effective attacks 37B. Such a filter used by a threat actor can include a phishing detection system in some embodiments, such as a detection system that is similar to a detection system of a security actor. And, both actors can take advantage of AI-enhanced detections systems. In the case of database 32A, the stored URLs that can be detected by a detection system of the security actor are ineffective phishing URLs. Also, the threat actors or security actors simulating threat actors can use other filters (e.g., filters that measure a success rate in tricking users of a site to reveal their credentials).

The trained classifier 36A can be generated from historical data on phishing attacks (such as attacks from database 32A), data on legitimate websites (such as data from the known legitimate online communications database 33A), the phishing communications generator 34A, and the AI training system 35A. And, the trained classifier 36A accepts possible phishing attacks 37A as input and outputs respective predictions 38A as to whether the possible phishing attacks 37A are indeed actual attacks or false alarms. In an example, the phishing communications generator 34A and the AI training system 35A uses a LSTM network to enhance the trained classifier 36A.

The trained classifier 36B can be generated from historical data on effect phishing attacks (such as effective attacks from database 32B), data on legitimate websites (such as data from the known legitimate online communications database 33B), the phishing communications generator 34B, and the AI training system 35B. And, the trained classifier 36B accepts effective phishing attacks 37B as input and outputs the enhanced phishing attacks 38B that should be even more effective phishing attacks. In an example, the phishing communications generator 34B and the AI training system 35B uses a LSTM network to enhance the trained classifier 36B.

In an example embodiment, using LSTM units, the AI training system 35A or 35B can build a model (e.g., the trained classifier 36A or 36B respectively). The model can then receive a URL as a character sequence as input. The character sequence can be received from one or more of the databases. The model then predicts if the URL corresponds to a case of phishing. Architectures using such functionality and LSTM networks are illustrated in FIGS. 5 and 6. In an example, each input character is translated by a 128-dimension embedding. Also, the translated URL is fed into a LSTM layer as a 150-step sequence. These processes can be performed by the phishing communications generator 34A of FIG. 1A or the generator 34B of FIG. 1B depending on the actor using the generator. Then, the classification is performed using an output sigmoid neuron, which can be an implementation of the trained classifier 36A or 36B. The LSTM network is trained by back-propagation using a cross-entropy loss function and dropout in the last layer, and can enhance phishing attacks by the threat actor computer systems 10 accordingly. Or, it can enhance simulated phishing attacks by the security actor computer systems 30. Either way, the training can occur through the AI training system 35A or 35B.

The non-threat actor computer systems 20 can include systems that produce and distribute legitimate websites. The threat actor computer systems 10 can produce and distribute counterfeit sites like the sites of the non-threat actor computer systems 20. The sites of the threat actor computer systems 10 can have a look and feel like corresponding legitimate sites of the non-threat actor computer systems 20, but the URLs of the legitimate and corresponding counterfeit websites will be different. Target sites of non-threat actor computer systems 20 that are imitated by threat actor computer systems 10 can include social media sites, e-commerce sites, and online banking sites. Also, non-threat actor computer systems 20 can be phishing victims, such as users who were tricked into visiting the phishing sites or legitimate sites where the phished information can be used.

As shown in FIG. 1A, the security actor computer systems 30 can include a phishing detection system 31A which is somewhat analogous to the phishing system 31B shown in FIG. 1B that is hosted by one of the threat actor computer systems 10. The main difference is that the phishing detection system 31A is used by the security actor computer systems 30 to enhance phishing detection systems and simulations of phishing attacks. Whereas the threat actor computer systems 10 use the phishing system 31B to enhance actual phishing attacks. Although, threat actor systems can also include phishing detection systems to enhance the generation of phishing communications.

To put it another way, in FIG. 1A, one of the security actor computer systems 30 is shown including a phishing detection system 31A. The phishing detection system 31A can include one or more of the phishing detection systems and the phishing simulation systems described herein. The phishing simulation systems described herein could also be a system for actual phishing attacks instead of being a simulator only. As shown in FIG. 1B, one of the threat actor computer systems 10 is shown including the phishing system 31B. In such an example, the phishing simulation system is a system for actual phishing attacks instead of being a simulator only.

Each of the computer systems 10, 20, and 30 can include memory that can include media. The media can include or be volatile memory components, non-volatile memory components, or a combination of such. In some embodiments, the memory is a storage system. An example of a storage system is a SSD. In some embodiments, the memory is a hybrid memory/storage sub-system. In general, each of the computer systems can include a host system that uses the memory. For example, the host system can write data to the memory and read data from the memory.

The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system and the memory. The host system can further utilize an NVM Express (NVMe) interface to access memory components when the memory is coupled with the host system by the PCIe interface. The physical host interface can provide an interface for passing control, address, data, and other signals between the memory and the host system.

The memory components can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system. Although non-volatile memory components such as NAND type flash memory are described, the memory components can be based on any other type of memory such as a volatile memory. In some embodiments, the memory components can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

A memory system controller (hereinafter referred to as "controller") can communicate with the memory components to perform operations such as reading data, writing data, or erasing data at the memory components and other such operations. The controller can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or other suitable processor. The controller can include a processor (processing device) configured to execute instructions stored in local memory. In the illustrated example, the local memory of the controller includes an embedded memory configured to store instructions for performing various processes, operations, logic flows, and routines that control operation of the memory, including handling communications between the memory and the host system. In some embodiments, the local memory can include memory registers storing memory pointers, fetched data, etc. The local memory can also include read-only memory (ROM) for storing micro-code. The example memory can include the controller, or in another embodiment of the present disclosure, the memory may not include a controller, and can instead rely upon external control (e.g., provided by an external host, or by a processor or controller separate from the memory).

In general, the controller can receive commands or operations from the host system and can convert the commands or operations into instructions or appropriate commands to achieve the desired access to the memory components. The controller can be responsible for other operations such as wear leveling operations, garbage collection operations, error detection and error-correcting code (ECC) operations, encryption operations, caching operations, and address translations between a logical block address and a physical block address that are associated with the memory components. The controller can further include host interface circuitry to communicate with the host system via the physical host interface. The host interface circuitry can convert the commands received from the host system into command instructions to access the memory components as well as convert responses associated with the memory components into information for the host system.

The memory can also include additional circuitry or components. In some embodiments, the memory can include a cache or buffer (e.g., DRAM) and address circuitry (e.g., a row decoder and a column decoder) that can receive an address from the controller and decode the address to access the memory components.

In some aspects of the present disclosure, the memory includes the system 31A or 31B. In some embodiments, the controller includes at least a portion of the system 31A or 31B. For example, the controller can include a processor (processing device) configured to execute instructions stored in local memory for performing the operations described herein such as the operations described herein associated with the system 31A or 31B. In some embodiments, the system 31A or 31B is part of the host system, an application, or an operating system.

The system 31A or 31B, which can include the phishing detection and phishing simulation systems described herein, can use the memory, the memory components, and the host system to detect phishing and generate a phishing simulation or an actual phishing attack.

In generating or enhancing the phishing detection system or the phishing system such as by the system 31A or 31B, it can be useful to filter out the many known phishing URLs that can be obtained from threat actor databases. It can be useful to filter a large known set of phishing URLs to URLs belonging to a selected set of known threat actors. One or more threat actors can be identified by the detection system by following URLs with similar patterns and hosted on the same compromised domains. The detection system can then cluster the actors to better understand the strategies used by the threat actors. The detection system can then use an existent AI or machine learning technologies to measure effectiveness rates or the like of threat actors. Also, the detection system can use a LSTM network or another form of AI to learn the intrinsic patterns that allow URLs of the selected treat actors to bypass the detection system. With the intrinsic patterns used as input, the phishing simulation system can generate new synthetic phishing communications such as new synthetic phishing URLs. And, these new synthetic phishing communications are generated with an objective of enhancing a phishing attack of a threat actor or a corresponding simulation.

Further details with regards to the operations of the phishing simulation system and the phishing detection system are described below.

Figure 2:
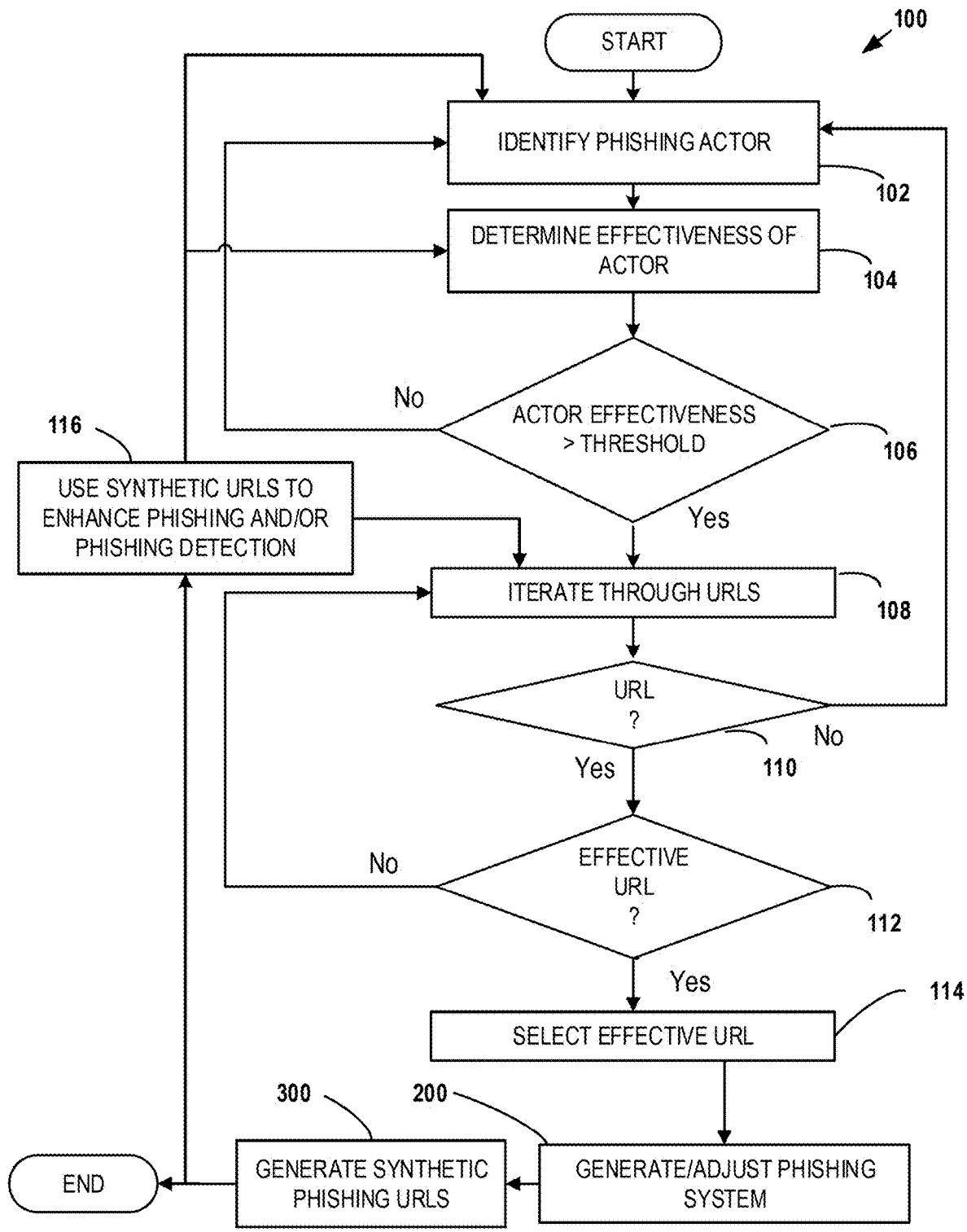
FIG. 2 is a flow diagram of an example method to implement phishing enhancement and detection using artificial intelligence in accordance with some embodiments of the present disclosure.

FIG. 2 is a flow diagram of an example method 100 to implement phishing enhancement and detection using artificial intelligence in accordance with some embodiments of the present disclosure. The method 100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 100 is performed by one or more aspects of the phishing detection system 31A or the phishing system 31B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 102, a processing device identifies a set of phishing threat actors. Each actor of the phishing threat actors can be identified by identifying URLs with certain path patterns (such as similar path patterns) on certain compromised domains (such as similar compromised domains). In some embodiments implemented by a security actor, the URLs can come from the known phishing attacks database 32A and/or the known legitimate online communications database 33A of FIG. 1A. In some other embodiments implemented by a threat actor, the URLs can come from the phishing attacks database 32B and/or the known legitimate online communications database 33B of FIG. 1B.

At block 104, the processing device determines an effectiveness rate of each actor of the set of phishing threat actors. The effectiveness rate is a percentage of URLs produced by the actor that avoid detection as phishing threats by a phishing detection system.

In general, at blocks 106 through 114, the processing device selects effective URLs from at least one effective phishing threat actor of the set of actors. The effective URLs are URLs that avoid detection as phishing threats by the phishing detection system. The at least one effective phishing threat actor has an effectiveness rate exceeding a selected threshold. In some embodiments, blocks 104 through 114 are performed by the phishing communications generator 34A or 34B.

Specifically, at block 106, the processing device determines if a phishing threat actor has an effectiveness rate that exceeds the threshold. If the actor's effectiveness rate does not exceed the threshold then the processing device can continue identifying other actors to determine their effectiveness at phishing. If a threat actor's effectiveness rate does exceed the threshold at block 106 then the processing device iterates through URLs of the effective phishing threat actor, at block 108. At block 110, the processing device determines if there is a URL of the effective actor to check such as during the iteration of block 108. If there is no URL to check, then the processing device returns to block 102 so the that processing device can identify another phishing threat actor. Otherwise, the processing device will check the next URL of the effect actor to identify whether it is effective or not, at block 112. And, if the URL is determined to be effective by the processing device at block 112 it is then selected by the processing device at block 114.

In an example embodiment, the method can start at block 108 in that the actors are predetermined and the method beings with selecting effective URLs of the predetermined actors. In such an example, the block 116 (where the synthetic URLs are used to enhance phishing and/or phishing detection) can provide feedback immediately to block 108 and so on since the actors are already predetermined.

At block 200, the processing device generates or adjusts the phishing system using a machine learning process to identify patterns in the selected effective URLs that enable the selected effective URLs to avoid detection as phishing threats by the phishing detection system. In some embodiments, block 200 is performed by the AI training system 35A or 35B. Also, in an example embodiment, the machine learning process includes using a LSTM network such as the LSTM network shown in FIG. 6.

In an embodiment, the phishing detection system includes a reactive detection system including a blacklist of URLs generated by at least one of manual reporting, honeypots, or crawling the web in search of known phishing characteristics. In a more exemplary embodiment, the phishing detection system includes a proactive detection system that uses a classification model using machine learning including at one of a support vector machine, streaming analytics, gradient boosting, random forests, latent Dirichlet allocation, online incremental learning, and a neural network.

In an example embodiment, the classification model classifies URLs. And, in some embodiments the classification model is a trained classifier such as the trained classifier 36A or 36B.

In an example embodiment, the proactive detection system includes a recurrent neural network. And, in a more exemplary embodiment, the recurrent neural network is based on a LSTM network such as shown in FIG. 5.

A neural network is a bio-inspired machine learning model that consists of a set of artificial neurons with connections between the neurons. Recurrent neural networks (RNN) are a type of neural network that can model sequential patterns. A distinctive characteristic of RNNs is that such networks can introduce the notion of time to the model, which in turn allows the networks to process sequential data one element at a time and learn the sequential dependencies of the elements. Although useful, a limitation of general RNNs is that they are unable to learn correlations between elements more than a certain number of steps apart, such as five to ten time steps apart.

An example embodiment of the phishing detection system can also use an AI system that overcomes the aforesaid problem with general RNNs, such as by using a LSTM network. A LSTM network can bridge elements separated by more than one thousand time steps apart without loss of short time lag capabilities. A LSTM network is an adaptation of RNN. With LSTM, each neuron is replaced by a memory cell that, in addition to a conventional neuron representing an internal state, uses multiplicative units as gates to control the flow of information. A typical LSTM cell has an input gate that controls the input of information from the outside, a 'forget cell' that controls whether to keep or forget the information in the internal state, and an output gate that allows or prevents the internal state to be seen from the outside.

The LSTM network, used by the detection system, is an improvement over conventional detection methods, whether the conventional detection methods are reactive or proactive. The LSTM network for instance is an improvement because instead of manually extracting features of a phishing communication such as a URL, the LSTM network of the detection system can directly learn a representation from a URL's character sequence. As each character in the URL sequence exhibits correlations, that is, nearby characters in a URL are likely to be related to each other. These sequential patterns can be exploited to improve the performance of the predictors of the LSTM network.

Using LSTM units, the detection system can build a model that receives as input a URL as character sequence and predicts if the URL corresponds to a case of a possible phishing. Architectures including LSTM networks are illustrated in FIGS. 5 and 6.

In FIG. 5, the architecture 500 includes each input character of the URL 502 is translated by a 128-dimension embedding 504. And, in such an example, the translated URL is fed into a LSTM layer 506 as a 150-step sequence. Then, the classification is performed using an output sigmoid neuron 508, which can be an implementation of the trained classifier 36A of FIG. 1A.

In FIG. 6, in the architecture 550, the LSTM network is trained by back-propagation using a cross-entropy loss function and dropout in the last layer (e.g., the dense layer 510), which can be included in an implementation of the AI training system 35B of FIG. 1B.

The aforesaid LSTM network model of some example embodiments of the phishing detection system has been shown to outperform traditional machine learning approaches such as the Random Forest (RF) algorithm.

Three example objects of threat actors are provided herein. By taking the role of a threat actor and analyzing the vast amount of data, the systems described herein can uncover the underlying structure of a phishing attack. Such attacks can follow several values summarized in the following objectives:

Objective (1) is to maximize the effectiveness rate defined as $E=n_E/n_T$, where $n_E$ is the number of URLs generated by a given technique that bypass a proactive phishing detection system and $n_T$ is the total generated URLs with the given technique.

Objective (2) is to maximize the success rate defined as $S=n_S/n_T$, where $n_S$ is the number of URLs generated by a given technique that actually steal user credentials.

Objective (3) is to maximize the operational efficiency defined $e=n_T/T$, where T is the wasted time from creating a certain amount $n_T$ of URLs.

The objectives provide a basis for the phishing URL generator, however each one is specific to different aspects of an attack. Objective (1) is directed to promoting URL generators able to defeat detection systems. Objective (2) is directed to tricking the end users to steal their credentials. In general, both objectives are not necessarily accomplished simultaneously, and there is a trade-off between the two objectives, such that increasing the first one will decrease the other, and vice-versa sometimes. Objective (3) is independent of the other objectives.

However, the phishing URL generator described in detail herein uses objective (1) as a basis. Thus, at block 200, the generating of the phishing system can include enhancing an effectiveness rate of a phishing attack by the at least one effective phishing threat actor. The effectiveness rate of a phishing attack is defined as a ratio between the number of URLs that avoid detection as a phishing threat by the detection system and the number of total known URLs generated by the at least one effective phishing threat actor. Alternatively, the effectiveness can be measured by another phishing detection system, or by other metrics, such as the actual success rate achieved in the past, or operational efficiency.

Alternatively, or additionally, at block 200, the generating of the phishing system can include enhancing a success rate of a phishing attack by the at least one effective phishing threat actor. The success rate of a phishing attack is defined by a ratio between the number of URLs that lead to retrieval of user credentials and the number of total known URLs generated by the at least one effective phishing threat actor.

Alternatively, or additionally, at block 200, the generating of the phishing system can include enhancing an operational efficiency rate of a phishing attack by the at least one effective phishing threat actor. The operational efficiency rate is defined by a ratio between the number of total known URLs generated by the at least one effective phishing threat actor and the amount of time spent to generate the total known URLs generated by the at least one effective phishing threat actor.

At block 300, the processing device generates synthetic phishing URLs using the phishing system and the identified patterns. In some embodiments, block 300 is performed by the phishing communications generator 34A or 34B.

The phishing URL generator includes an AI system that enhances a threat actor by learning the effective patterns of the threat actor's previous phishing attacks. The phishing URL generator can use effective URLs as an input to learn intrinsic structure, such that it generates new synthetic URLs preserving such characteristics.

In an example embodiment, the phishing URL generator collects and concatenates the effective URLs from historical phishing data. The phishing URL generator collects and concatenates the URLs in a full prose text. Then, from full text, taking steps of size S, the generator creates sentences with lengths L that a model implemented by the generator will use to learn which is the next character. With this setup, the generator uses a one-hot encoding representation of the data based on previously defined vocabulary, such that X and Y take the form:

X features with shape N×L×V,

Y label with shape N×V, where N is the number of sentences and V is the number of different characters in the vocabulary. For each row in X representing a sentence is predicted a row in Y representing a probability distribution of the next character.

Using a recurrent neural network (RNN), in particular a LSTM network, the generator can build a model that receives as input the one-hot encoding (such as the one-hot encoding 512 shown in FIG. 5 or 6) and feeds the one-hot encoding into a LSTM layer (such as LSTM layer 506). In an example, as shown in FIG. 6 as well, the LSTM layer 506 is connected to the dense layer 510 with V neurons and the classification by the phishing URL generator is performed using an output sigmoid neuron 508. The LSTM network is trained by back-propagation using a categorical cross-entropy loss function (which can be provided at least partially by the dense layer 510). Also, in some example embodiments, a root mean square propagation (RMSProp) optimizer can be used to prevent oscillations in enhancement stages of the phishing URL generation.

At block 116, the processing device uses the synthetic phishing URLs to enhance phishing and/or enhance phishing detection. As shown, at block 116, the processing device can provide a feedback mechanism that can train, configure, re-configure, or adjust: the phishing detection system or its operations at blocks 102 through 114, the generation or adjusting of the phishing system at block 200, or the generation of synthetic phishing URLs at block 300. For example, at block 116, the processing device can adjust the phishing detection system to recognize the synthetic phishing URLs such that the phishing detection system is enhanced by the generated phishing system. And, following block 116, the processing device can re-determine an effectiveness rate of each actor of the set of phishing threat actors, at block 104, after adjusting the phishing detection system to recognize the synthetic phishing URLs. Also, following block 116, the processing device can re-identify a set of phishing threat actors at block 102 and so on.

Also, following block 116, the processing device can re-select effective URLs from at least one effective phishing threat actor of the set of actors, at block 114, after adjusting the phishing detection system to recognize the synthetic phishing URLs. And, the processing device can then adjust the phishing system, essentially at block 200, using the machine learning process to identify second patterns in the re-selected effective URLs that enable the re-selected effective URLs to avoid detection as phishing threats by the adjusted phishing detection system. The processing device can then also generate second synthetic phishing URLs, at block 300, using the adjusted phishing system and the identified second patterns. And, further, the processing device can re-adjust the adjusted phishing detection system, at block 116, to recognize the second synthetic phishing URLs such that the adjusted phishing detection system is further enhanced by the adjusted phishing system and the adjusted phishing system is enhanced by itself as well.

Figure 3:
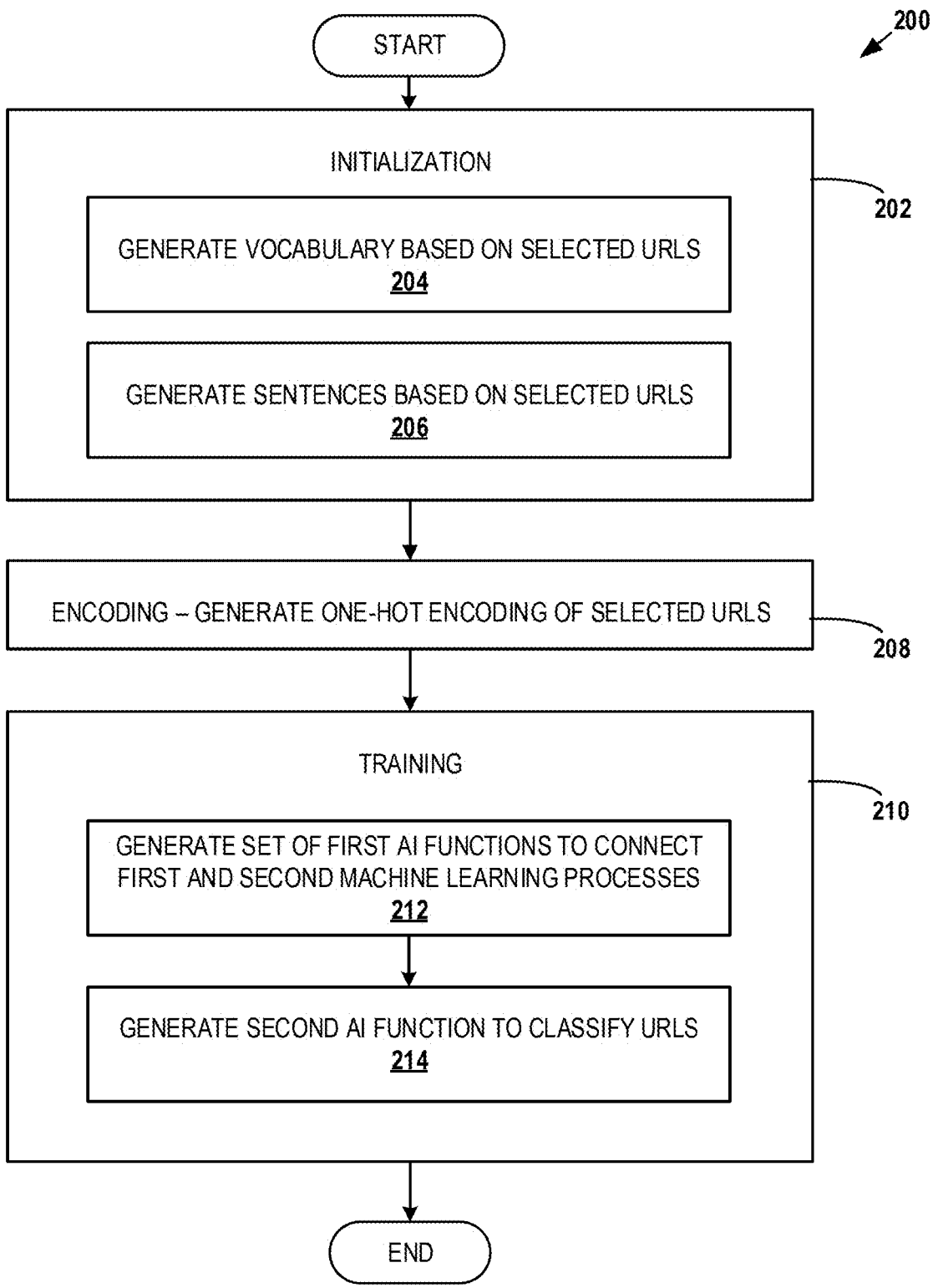
FIG. 3 is a flow diagram of an example method to generate or adjust the phishing system in accordance with some embodiments of the present disclosure.

FIG. 3 is a flow diagram of an example method 200 to generate or adjust the phishing system in accordance with some embodiments of the present disclosure. For instance, FIG. 3 illustrates an example method 200 to generate or adjust the phishing detection system 31A or the phishing system 31B. Method 200 occurs at block 200 of FIG. 2, for example. In other words, block 200 of FIG. 2 includes blocks 202 through 214 of FIG. 3, and block 200 and method 200 are essentially the same element 200. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by one or more aspects of the system 31A or 31B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 202, the processing device enters an initialization phase of the generation of the phishing system. At block 204, in the initialization phase, the processing device generates a vocabulary of the at least one effective phishing threat actor based on the selected effective URLs. At block 206, in the initialization phase, the processing device generates sentences based on the selected effective URLs. In an example embodiment, the generating the sentences includes collecting and concatenating the selected effective URLs into a full prose text. Also, in such an example, the generating of the sentences includes generating the sentences from the full prose text, and the sentences have lengths L by taking steps of size S.

At block 208, the processing device enters an encoding phase of the generation of the phishing system. At block 208, in the encoding phase, the processing device generates a one-hot encoding representation of the selected effective URLs based on the generated vocabulary and the generated sentences. In an example embodiment, generating the one-hot encoding representation includes generating a model define by X features with shape N×L×V. The model also includes Y label which has shape N×V. And, N is the number of sentences and V is the number of different characters in the vocabulary such that for each row in X representing a sentence is predicted a row in Y representing a probability distribution of a next character.

At block 210, the processing device enters a training phase of the generation of the phishing system. In the training phase, the processing device receives, by the machine learning process, the one-hot encoding representation. At block 212, in the training phase, the processing device, by the machine learning process, generates a set of first AI functions that connect the machine learning process to a second machine learning process. At block 214, in the training phase (such as performed by the AI training system 35A or 35B), the processing device, by the second machine learning process, generates a second AI function that classifies the selected effective URLs. In such a case, the second AI function can be the train classifier 36A or 36B.

At the block 210, in the training phase, the machine learning process can include using a LSTM network based process such as the one illustrated in FIG. 6, wherein the second machine learning process includes a dense layer, wherein the set of first AI functions is a set of neurons, and wherein the second AI function is a sigmoid neuron. In such a training phase, the LSTM network can be trained by back-propagation using a categorical cross-entropy loss function and a root mean square propagation optimizer to prevent oscillations during the training phase.

Figure 4:
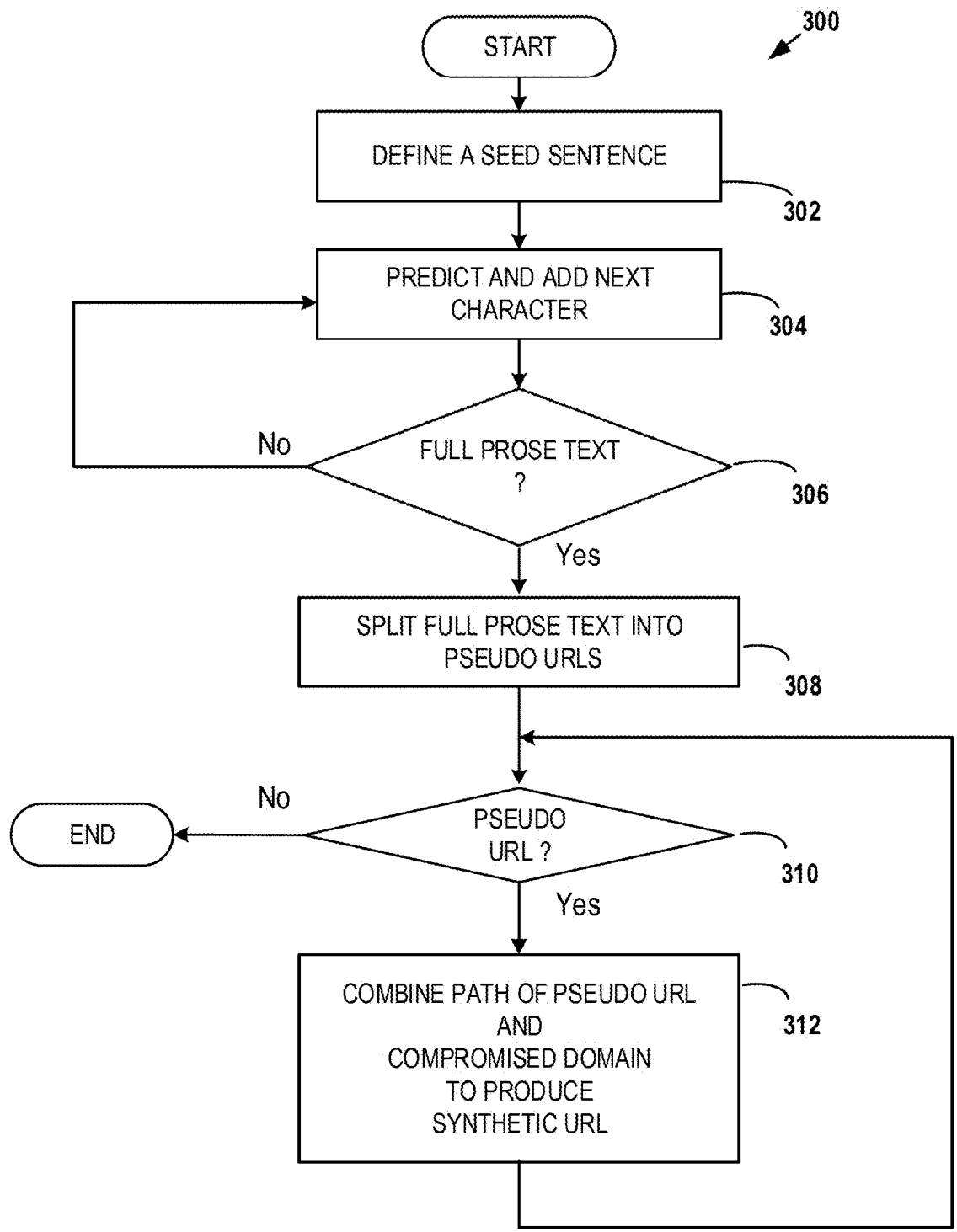
FIG. 4 is a flow diagram of an example method to generate the synthetic phishing URLs using the phishing system in accordance with some embodiments of the present disclosure.

FIG. 4 is a flow diagram of an example method 300 to generate the synthetic phishing URLs using the phishing system in accordance with some embodiments of the present disclosure. For instance, FIG. 4 is a flow diagram of a method 300 to generate the synthetic phishing URLs using the generated phishing system generated in method 200. To put it another way, block 300 of FIG. 2 includes blocks 302 through 312 of FIG. 4, and block 300 and method 300 are essentially the same element 300. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by one or more aspects of the phishing detection system 31A or the phishing system 31B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

To generate the synthetic URLs, the phishing URL generator defines a seed sentence and predicts the next character iteratively. To get variability in the prediction, the generator tunes a degeneration parameter to shift predicted probability distribution. Once the generator generates a full prose text, it splits it using Hypertext Transfer Protocol (HTTP) structure to produce a list of pseudo URLs.

Specifically, at block 302, the processing device defines a seed sentence using the identified patterns in the selected effective URLs that enable the selected effective URLs to avoid detection as phishing threats by the phishing detection system.

At block 304, the processing device predicts and adds a next character iteratively to the seed sentence according to the identified patterns. At block 306, the processing device determines if the sentence is a full prose text. If the sentence is determined not to be full prose text that then processing device returns to block 304 to predict and add a next character. Otherwise the processing device continues to block 308.

At block 304, in some example embodiments, the processing device can generate variability in the prediction of the next character using a degeneration parameter.

At block 308, the processing device, upon generating the sentence in a full prose text, splits the full prose text by http structure to produce a list of pseudo URLs.

At block 310 and 312, for each pseudo URL, the processing device concatenates a synthetic path of the pseudo URL to the domain compromised by the at least one effective phishing threat actor to produce a synthetic URL for a phishing attack or a simulated phishing attack. Specifically, at block 310 the processing device checks for a next pseudo URL and if there is no next pseudo URL then the process ends. Otherwise, the processing device continues to concatenate synthetic paths of pseudo URLs to the domain until there are no pseudo URLs remaining to add. The generator can assign a compromised domain for each synthetic path, such that the synthetic URLs take the form: http://+TLD+path.

At block 312, in some example embodiments, the processing device can filter the pseudo URLs by removing repeated pseudo URLs and dropping invalid characters in the pseudo URLs. To put it another way, the phishing URL generator can clean the data such as by removing repeated pseudo URLs and dropping meaningless and forbidden characters. The generator can also clean the data by selecting for use only the generated synthetic paths of the pseudo URLs.

FIG. 5 is schematic diagram of an example artificial intelligence architecture 500 based on a LSTM network in accordance with some embodiments of the present disclosure. LSTM architecture 500 can implement the phishing communications generator 34A or 34B and/or the AI training system 35A as well as output the trained classifier 36A as the output sigmoid neuron 508. Each input character of the URL 502 is translated into a one-hot encoding 512. The encoded data is fed into the LSTM layer 506 after each input character of the URL 502 is translated by a 128-dimension embedding 504. And, after the processing of the LSTM layer, the classification is performed using the output sigmoid neuron 508.

FIG. 6 is schematic diagram of another example artificial intelligence architecture 550 based on a LSTM network in accordance with some embodiments of the present disclosure. LSTM architecture 550 can implement the phishing communications generator 34A or 34B and/or the AI training system 35B as well as output the trained classifier 36B as the output sigmoid neuron 508. Each input character of the URL 502 is translated into a one-hot encoding 512. The encoded data is fed into the LSTM layer 506. And, after the processing of the LSTM layer, the data is fed to the dense layer 510. The LSTM layer 506 is fully connected to the dense layer 510. And, after processing by the dense layer 510, the classification is performed using the output sigmoid neuron 508.

FIG. 7 illustrates example pseudocode that can be used as a basis for computer programming the phishing URL generator and the aforesaid operations of the generator.

As mentioned herein, AI can be used by the systems as a weapon to enhance phishing by a threat actor or by a simulated threat actor. Besides the aforementioned technologies, there are known approaches that use AI for simulated phishing attacks. These known approaches can include: Honey-Phish, SNAP_R, and Deep DGA. And, such known approaches can be combined with the phishing detection or phishing systems disclosed herein. It should be noted that such technologies could also be used or combined with the disclosed systems for actual phishing attacks and not merely simulations.

The Honey-Phish technique uses Markov Chains for natural language processing to create spear phishing for actual phishers. The idea is to automate responses to phishing emails to establish an email communication with the attacker, these responses to scamming emails contain a link that traces the geographical location. Although it is preferred that the systems disclosed herein are only used by security actors providing detection systems or simulation systems, it is imaginable that harmful application is possible harnessing the AI to create targeted spear-phishing attacks.

The SNAP R technique uses the basis of Honey-Phish for spear-phishing creation using not emails but social media communications such as Twitter as a target communication channel. This approach finds profiles and personalizes phishing posts by scoring the target's probability of responding and clicking on generated phishing links. In this case the treat actor takes advantage of shortened links in social media posts such as Twitter to conceal the URL.

The Deep DGA technique uses Generative Adversarial Networks (GAN) to create artificial malware domains that are hard to detect, even by a deep learning based detector. Using multiple rounds of generator and detector, the Deep DGA algorithm showed that the generator increased the rate of undetected domains in each round, and that the detector improved its performance in detecting domains after each round.

Figure 8:
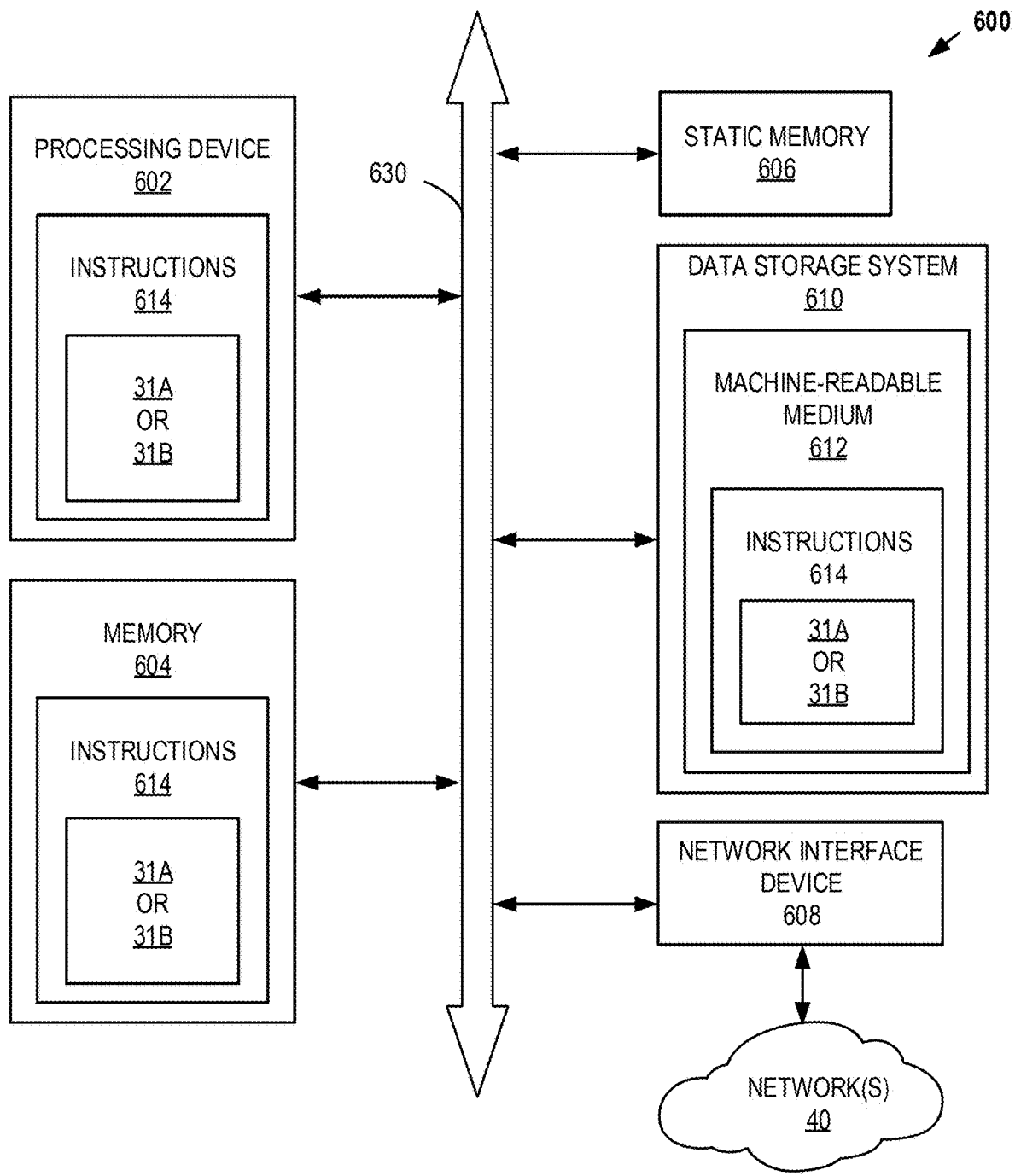
FIG. 8 is a block diagram of example aspects of an example computer system in accordance with some embodiments of the present disclosure.

FIG. 8 is a block diagram of example aspects of an example computer system 600 in accordance with some embodiments of the present disclosure. FIG. 8 illustrates parts of the computer system 600 within which a set of instructions, for causing the machine to perform any one or more of the methodologies discussed herein, can be executed. In some embodiments, the computer system 600 can correspond to a host system that includes, is coupled to, or utilizes memory or can be used to perform the operations of a controller (e.g., to execute an operating system to perform operations corresponding to the phishing detection system 31A or the phishing system 31B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 610, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 614 for performing the operations and steps discussed herein, such as operations associated with the system 31A or 31B. The computer system 600 can further include a network interface device 608 to communicate over the communications network(s) 40 of FIGS. 1A and 1B.

The data storage system 610 can include a machine-readable storage medium 612 (also known as a computer-readable medium) on which is stored one or more sets of instructions 614 or software embodying any one or more of the methodologies or functions described herein, such as operations associated with the system 31A or 31B. The instructions 614 can also reside, completely or at least partially, within the main memory 604 and/or within the processing device 602 during execution thereof by the computer system 600, the main memory 604 and the processing device 602 also constituting machine-readable storage media. The machine-readable storage medium 612, data storage system 610, and/or main memory 604 can correspond to the memory sub-system 110 of FIG. 1A or 1B.

In one embodiment, the instructions 614 include instructions to implement functionality corresponding to the system 31A or 31B. While the machine-readable storage medium 612 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   generating a phishing system using a machine learning process using a long short-term memory (LSTM) network to identify patterns in effective URLs that enable the effective URLs to avoid detection as phishing threats by a phishing detection system, wherein the effective URLs are from at least one effective phishing threat actor of a set of phishing threat actors, and wherein the effective URLs are URLs that avoid detection as phishing threats by the phishing detection system;
   generating, by the machine learning process, a set of first artificial intelligence (AI) functions comprising a set of neurons that connect the machine learning process to a second machine learning process; and
   generating, by the second machine learning process, a second AI function that classifies the effective URLs, wherein the second AI function is a sigmoid neuron;
   generating synthetic phishing URLs using the generated phishing system and the identified patterns; and
   adjusting the phishing detection system to recognize the synthetic phishing URLs such that the phishing detection system is enhanced by the generated phishing system.

2. The method of claim 1, further comprising:
   selecting new effective URLs from at least one effective phishing threat actor of the set of actors after adjusting the phishing detection system to recognize the synthetic phishing URLs;
   adjusting the phishing system using the machine learning process to identify second patterns in the new effective URLs that enable the new effective URLs to avoid detection as phishing threats by the adjusted phishing detection system;
   generating second synthetic phishing URLs using the adjusted phishing system and the identified second patterns; and
   re-adjusting the adjusted phishing detection system to recognize the second synthetic phishing URLs such that the adjusted phishing detection system is further enhanced by the adjusted phishing system.

3. The method of claim 1, wherein the machine learning process to identify patterns in the effective URLs comprises using a long short-term memory (LSTM) network.

4. The method of claim 1, wherein the phishing detection system comprises a proactive detection system that uses a classification model that classifies URLs, and wherein the proactive detection system comprises using a long short-term memory (LSTM) network.

5. The method of claim 1, wherein generating the phishing system comprises enhancing an effectiveness rate of a phishing attack by the at least one effective phishing threat actor, wherein the effectiveness rate of a phishing attack is defined as a ratio between the number of URLs that avoid detection as a phishing threat by the detection system and the number of total known URLs generated by the at least one effective phishing threat actor.

6. The method of claim 1, wherein generating the phishing system comprises enhancing a success rate of a phishing attack by the at least one effective phishing threat actor, wherein the success rate of a phishing attack is defined by a ratio between the number of URLs that lead to retrieval of user credentials and the number of total known URLs generated by the at least one effective phishing threat actor.

7. The method of claim 1, wherein generating the phishing system comprises enhancing an operational efficiency rate of a phishing attack by the at least one effective phishing threat actor, wherein the operational efficiency rate is defined by a ratio between the number of total known URLs generated by the at least one effective phishing threat actor and the amount of time spent to generate the total known URLs generated by the at least one effective phishing threat actor.

8. The method of claim 1, wherein the generating the phishing system comprises an initialization phase, comprising:
   generating a vocabulary of the at least one effective phishing threat actor based on the effective URLs; and
   generating sentences based on the effective URLs.

9. The method of claim 8, wherein the generating the phishing system comprises an encoding phase, comprising generating a one-hot encoding representation of the effective URLs based on the generated vocabulary and the generated sentences.

10. The method of claim 9, wherein the generating the phishing system comprises a training phase, comprising:
    receiving, by the machine learning process, the one-hot encoding representation.

11. The method of claim 1, wherein the LSTM network is trained by back-propagation using a categorical cross-entropy loss function and a root mean square propagation optimizer to prevent oscillations during the training phase.

12. The method of claim 8, wherein generating the sentences comprises:
  collecting and concatenating the effective URLs into a full prose text; and
  generating the sentences from the full prose text, wherein the sentences have lengths L by taking steps of size S.

13. The method of claim 9, wherein generating the sentences comprises:
  collecting and concatenating the effective URLs into a full prose text; and
  generating the sentences from the full prose text, wherein the sentences have lengths L by taking steps of size S, and
  wherein generating the one-hot encoding representation comprises generating a model defined by:
    X features with shape N×L×V, and
    Y label with shape N×V,
      wherein N is the number of sentences and V is the number of different characters in the vocabulary such that for each row in X representing a sentence is predicted a row in Y representing a probability distribution of a next character.

14. The method of claim 1, wherein generating synthetic phishing URLs using the generated phishing system, comprises:
  defining a seed sentence using the identified patterns in the effective URLs that enable the effective URLs to avoid detection as phishing threats by the phishing detection system; and
  predicting and adding a next character iteratively to the seed sentence according to the identified patterns.

15. The method of claim 14, wherein generating synthetic phishing URLs using the generated phishing system, comprises:
  upon generating the sentence in a full prose text, splitting the full prose text by http structure to produce a list of pseudo URLs; and
  for each pseudo URL, concatenating a synthetic path of the pseudo URL to the domain compromised by the at least one effective phishing threat actor to produce a synthetic URL.

16. The method of claim 14, further comprising generating variability in the prediction of the next character using a degeneration parameter.

17. The method of claim 15, further comprising filtering the pseudo URLs by removing repeated pseudo URLs and dropping invalid characters in the pseudo URLs.

18. A non-transitory computer-readable storage medium comprising instructions that, when executed by a processing device, cause the processing device to:
  identify a set of phishing threat actors, wherein each actor of the phishing threat actors is identified by identifying uniform resource locations (URLs) with certain path patterns on certain compromised domains;
  determine an effectiveness rate of each actor of the set of phishing threat actors, wherein the effectiveness rate is a percentage of URLs produced by the actor that avoid detection as phishing threats by a phishing detection system;
  select effective URLs from at least one effective phishing threat actor of the set of actors,
  wherein the effective URLs are URLs that avoid detection as phishing threats by the phishing detection system, and
  wherein the at least one effective phishing threat actor has an effectiveness rate exceeding a selected threshold;
  generate, using a machine learning process, a phishing system using a long short-term memory (LSTM) network to identify patterns in the selected effective URLs that enable the selected effective URLs to avoid detection as phishing threats by the phishing detection system;
  generate, by the machine learning process, a set of first artificial intelligence (AI) functions comprising a set of neurons that connect the machine learning process to a second machine learning process; and
  generate, by the second machine learning process, a second AI function that classifies the effective URLs, wherein the second AI function is a sigmoid neuron;
  generate synthetic phishing URLs using the generated phishing system and the identified patterns; and
  train the phishing detection system according to the synthetic phishing URLs such that the phishing detection system is enhanced by the generated phishing system.

19. A computer system, comprising:
a processing device; and
memory in communication with the processing device and storing instructions that, when executed by the processing device, cause the processing device to:
  generate, by a first machine learning process, a set of first artificial intelligence (AI) functions comprising a set of neurons that connect the machine learning process to a second machine learning process; and
  generate, by the second machine learning process, a second AI function that classifies effective URLs, wherein the second AI function is a sigmoid neuron;
  generate synthetic phishing uniform resource locations (URLs) based on the effective phishing URLs, by:
    defining a seed sentence using identified patterns in the effective URLs that enable the effective URLs to avoid detection as phishing threats by a phishing detection system, wherein the patterns are identified by the machine learning process using a long short-term memory (LSTM) network;
    predicting and adding a next character iteratively to the seed sentence according to the effective URLs;
    producing a list of pseudo URLs from the sentence; and
    for each pseudo URL, combining a synthetic path of the pseudo URL with a domain compromised by the at least one effective phishing threat actor to produce a synthetic URL; and
  train the computer system according to the synthetic phishing URLs such that the computer system is enhanced by the training in that it can produce synthetic phishing URLs with increased effectiveness at avoiding detection as phishing threats by the phishing detection system.

* * * * *